(No Model.)
F. BOAS & S. WEINMANN.
SCALE MEASURE.
No. 492,569. Patented Feb. 28, 1893.
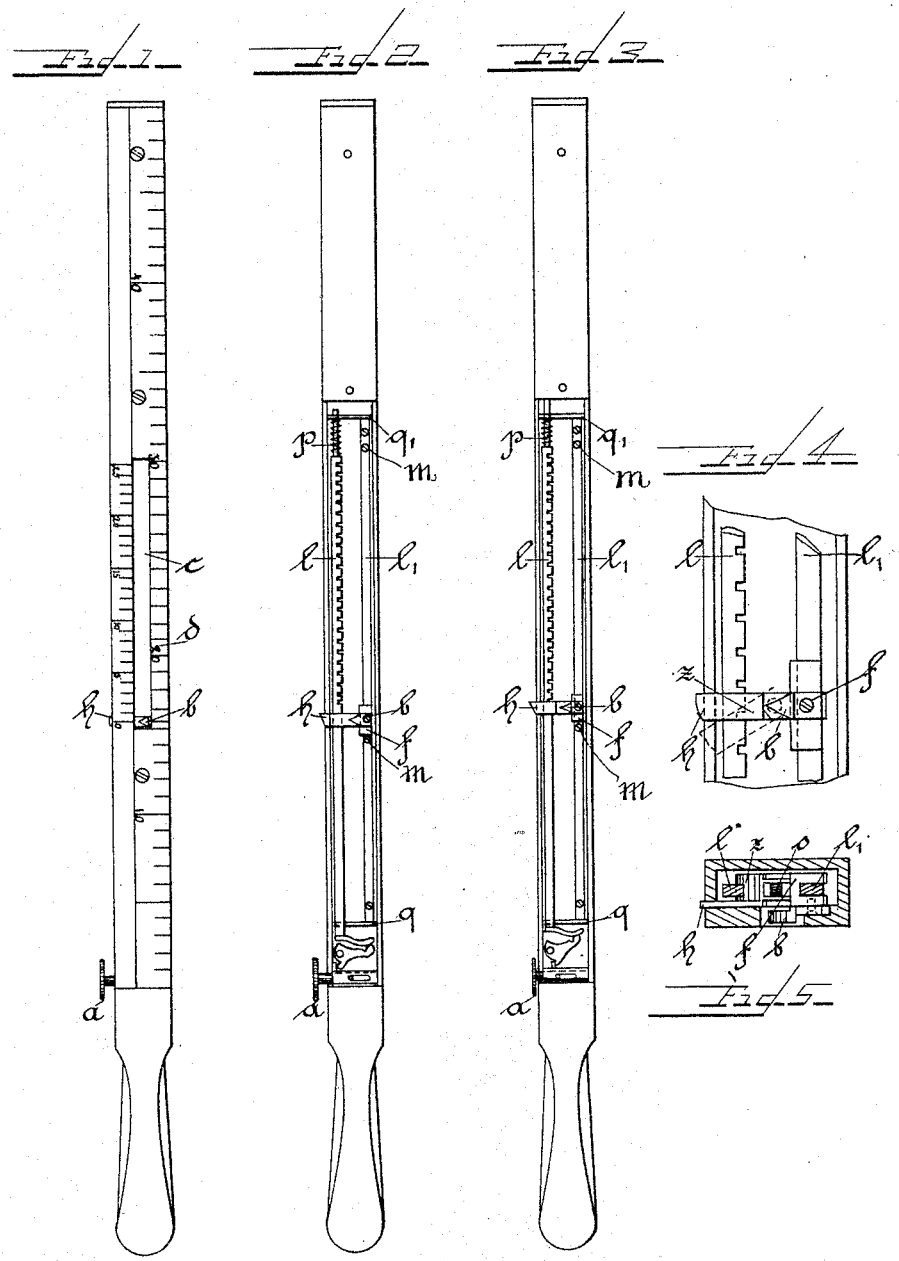

UNITED STATES PATENT OFFICE.

FELIX BOAS, OF POTSDAM, AND SAMUEL WEINMANN, OF CHARLOTTENBURG, GERMANY.

SCALE-MEASURE.

SPECIFICATION forming part of Letters Patent No. 492,569, dated February 28, 1893.

Application filed October 6, 1892. Serial No. 448,050. (No model.)

*To all whom it may concern:*

Be it known that we, FELIX BOAS, of Potsdam, and SAMUEL WEINMANN, of Charlottenburg, in the Kingdom of Prussia and German Empire, have invented a new and useful Improvement in Measures for Measuring and Indicating a Series of Lengths; and we do hereby declare that the following is a full, clear, and exact description of the invention, such as will enable others skilled in the art to which it appertains to make and use the same.

This invention relates to a measuring stick or staff which will indicate at a glance the number of yards or other lengths which have been measured, in measuring out a piece of cloth for example, and will thus render it unnecessary to keep mental count or to mark down the total number of measurements made, and enable a long piece of cloth to be measured accurately and comfortably and with a minimum risk of error.

In a measure constructed according to our invention, we mark upon the face of the measure, on one edge, a series of numbered divisions and within the body of the measure we arrange mechanism carrying a pointer, which can be moved over the series of divisions step by step. The pointer being advanced one step for each measure taken, the total number of measures will be indicated by the distance of the pointer from zero on the scale or series of divisions. Thus if the measure be a yard measure and a piece of cloth twenty yards long has to be measured, the pointer will at the end of the measurement indicate 20 on the divided scale. The motion of the pointer is effected by pressing upon a suitable knob or lever, once for every measurement taken, the knob or lever being connected with the pointer mechanism.

We will more particularly describe our said invention with reference to the accompanying drawings.

Figure 1 of these drawings represents the measure constructed according to our invention. Fig. 2 shows the measure in plan with the top removed and with the presser in its normal condition. Fig. 3 is a corresponding plan showing the presser depressed in the act of moving the pointer forward. Fig. 4 is a partial plan on an enlarged scale, of the pointer mechanism. Fig. 5 is a cross section of Fig. 4.

For greater clearness, we will describe our improvements as applied to a yard measure, although the total length shown on Fig. 1 is fifty inches, or centimeters, or whatever unit may be taken. The knob or presser, by means of which the pointer is moved once for each yard measured is shown at $a$, the pointer at $b$, and the scale showing the number of yards measured, at $c$.

Within the body of the measure there are two fixed transverse pieces $q$, $q'$, carrying at one end the guide rod $1'$ and having sliding therein at the other end, the toothed rod 1. On the guide rod $1'$, there is mounted a small sliding carriage $f$ the motion of which is limited at each end by the screws $m$ $m$ secured in the guide rod. The pointer $b$, is fixed upon the carriage, and moves along the slot $d$ shown in Fig. 1 and in cross section in Fig. 5. The carriage $f$ may be pressed into contact with the guide rod by a spring, and it carries in addition to the pointer $b$, a pivoted pawl $z$. This click is beveled on one side and engages with the teeth in the rod 1, in such a manner that when the rod is pressed toward the point of the measure, the engagement of the pawl with the teeth of the rod compels the carriage and pointer to move forward, but when the rod is returned, the teeth of the rod pass over the beveled side of the pawl and the carriage and pointer remain stationary. There is connected with the pawl $z$, a lever $h$, the end of which projects through a slot formed in the side of the measure and a spring $s$, secured to the pin on which the pawl is pivoted, tends to maintain the pawl and lever in the position shown by the full lines in Fig. 4. Thus when the required number of yards have been measured, or when the pointer has arrived at the end of the scale, the outer end of the lever $h$ may be moved back into the position indicated by the dotted lines in Fig. 4 putting the click out of engagement with the teeth of the rod 1, when the pointer may be returned to zero on the scale.

The distance between the teeth on the rod 1 is the same is that between the divisions of the scale $c$ and it is arranged that for every movement of the rod 1, the pointer is moved through this distance. This may be accomplished by means of the presser rod 2, on which there is fixed a pin engaging with the rocking lever $r$, which on the depression of the presser rod, is forced against a projection from the rod 1, and thereby pushes that rod forward. At the opposite end of this rod there is a spiral spring $p$, pressing against the transverse piece $q'$ and an enlarged part of the rod. As soon as the pressure exerted by the presser $a$, is relieved, this spring $p$, returns the rod 1 to its original position ready for another stroke. The normal positions of the presser $a$ of the rocking lever $r$, and of the rod 1 are shown by Fig. 2, their positions when the presser is pushed down, are shown by Fig. 3. The pressure of the spring $n$ binds the carriage upon the rod $1'$ sufficiently to prevent its return with the motion of the toothed rod 1.

What we claim, and desire to secure by Letters Patent, is—

1. The combination with the measure provided with an indicating scale, of a sliding indicator having a pointer adjacent to said scale, said indicator being provided with a pawl, a reciprocating toothed rod, a finger piece adapted to reciprocate said toothed rod, said toothed rod engaging said pawl positively and moving it, when the rod is moved in one direction and passing over said click when moved in the opposite direction, substantially as described.

2. The combination with a measure provided with an indicating scale, of a sliding indicator having a pointer adjacent to said scale, said indicator being provided with a beveled pawl, the reciprocating toothed rod for engaging said pawl positively when moved in one direction and sliding over said pawl when moved in the other direction, and a finger piece for moving said rod, whereby said indicator will be moved once for each reciprocation of said rod, substantially as described.

3. The combination with the measure provided with an indicating scale, of a guide rod, an indicator mounted to slide therein and carrying a pointer adjacent to said scale, the indicator having a pivoted pawl, a reciprocating toothed rod for engaging said pawl positively when moved in one direction and sliding over said pawl when moved in the opposite direction, and a finger piece for moving said toothed rod, said pawl being provided with an operating lever for removing it from engagement with the toothed rod, substantially as described.

4. The combination with a measure provided with an indicator scale, of a guide rod, an indicator mounted to slide thereon and having a pointer adjacent to said scale, said indicator having a pivoted beveled pawl, a reciprocating toothed rod engaging said pawl positively when moved in one direction and sliding over said click when moved in the opposite direction, a finger piece for moving said toothed rod in one direction and a spring for moving said rod in the opposite direction and a device for disengaging said pawl from said toothed rod to permit the indicator to be moved independently thereof, substantially as described.

In witness whereof we have hereunto set our hands in presence of two witnesses.

FELIX BOAS.
SAMUEL WEINMANN.

Witnesses:
PAUL FISCHER,
PAUL BRINKMANN.